(12) United States Patent
Schroeder et al.

(10) Patent No.: US 11,760,576 B2
(45) Date of Patent: Sep. 19, 2023

(54) CONVEYOR BELT WITH FLOW CONTROL CLEATS

(71) Applicant: ContiTech Transportbandsysteme GmbH, Hannover (DE)

(72) Inventors: Michael B. Schroeder, Wahpeton, ND (US); Travis Mackey, Wahpeton, ND (US); Zach Kosienski, Wahpeton, ND (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 17/830,787

(22) Filed: Jun. 2, 2022

(65) Prior Publication Data

US 2022/0289487 A1  Sep. 15, 2022

Related U.S. Application Data

(63) Continuation-in-part of application No. 17/181,317, filed on Feb. 22, 2021, now Pat. No. 11,352,211.

(60) Provisional application No. 62/987,941, filed on Mar. 11, 2020.

(51) Int. Cl.
*B65G 15/42* (2006.01)
*B65G 15/34* (2006.01)

(52) U.S. Cl.
CPC ............ *B65G 15/42* (2013.01); *B65G 15/34* (2013.01); *B65G 2201/042* (2013.01)

(58) Field of Classification Search
CPC ........ B65G 15/42; B65G 15/44; B65G 43/00; B65G 2201/042; B65G 15/34

USPC ........................................... 198/690.2, 699.1
See application file for complete search history.

(56) References Cited

U.S. PATENT DOCUMENTS

| | | | | |
|---|---|---|---|---|
| 4,426,926 A | * | 1/1984 | Soteropulos | A01F 15/07 100/88 |
| 6,371,280 B1 | * | 4/2002 | Lindner | B65G 15/44 198/690.2 |
| 10,617,060 B2 | * | 4/2020 | Hasenour | A01D 41/14 |
| 11,352,211 B2 | * | 6/2022 | Schroeder | B65G 15/44 |
| 2002/0175055 A1 | * | 11/2002 | Ryde | B65G 15/42 198/690.2 |
| 2015/0125584 A1 | * | 5/2015 | Kodali | A23N 15/04 99/641 |

(Continued)

*Primary Examiner* — James R Bidwell

(57) ABSTRACT

A conveyor belt with flow control cleats that includes belting, first cleats and second cleats. The belting has a first side edge and a second side edge. The first cleats extend from the belting. The first cleats are oriented at an angle with respect to the first side edge of between about 30 degrees and about 60 degrees. The second cleats extend from the belting. The second cleats are oriented at an angle with respect to the second side edge of between about 30 degrees and about 60 degrees. The first cleats and the second cleats both include a first long cleat section, a second long cleat section, a short cleat section and a third long cleat section. The short cleat section has a length that is shorter than a length of the first long cleat section. The second long cleat section is between the first long cleat section and the short cleat section. The short cleat section is between the second long cleat section and the third long cleat section. A first recess is defined between second long cleat section of the first cleats, the third long cleat section of the second cleats, the short cleat section of the first cleats and the short cleat section of the second cleats.

23 Claims, 7 Drawing Sheets

(56) References Cited

U.S. PATENT DOCUMENTS

2016/0031650 A1\* 2/2016 Petersen ............... B65G 15/42
  198/699.1
2018/0352742 A1\* 12/2018 Hasenour ............... A01D 57/20

\* cited by examiner

US 11,760,576 B2

CONVEYOR BELT WITH FLOW CONTROL CLEATS

REFERENCE TO RELATED APPLICATION

This application is a continuation-in-part of U.S. application Ser. No. 17/181,317, filed on Feb. 22, 2021, which claims priority to Provisional Applic. No. 62/987,941, filed on Mar. 11, 2020, the contents of which are incorporated herein by reference.

FIELD OF THE INVENTION

The invention relates generally to conveyor belts. More particularly, the invention relates to conveyor belts with flow control cleats.

BACKGROUND OF THE INVENTION

Because of their ability to move large amounts of material, conveyors have long been used in industry such as for moving agricultural products, rocks and other mined materials and various manufactured products.

In many situations, the conveyors include a plurality of cleats that extend from the surface thereof in a spaced-apart configuration. The cleats enhance the amount of product that can be moved using the conveyor as compared to conveyor configurations that do not include cleats.

One area in which conveyors are extensively used is equipment for moving agricultural products because the conveyor minimizes the potential damage to the agricultural products.

One challenge with prior art conveyors is that while it is desirable for the product being conveyed on the conveyor to be dispersed across the width of the conveyor, it is also desirable to minimize the potential of the product falling off the sides of the conveyor.

The conveyor belt illustrated in FIG. 4 has a generally V-shaped cleat that while minimizing the potential of objects falling off the sides of the conveyor, permits the objects to move with respect to the conveyor belt, which increases wearing of the belting and the cleats. This prior art conveyor belt also permits the objects to contact each other and such contact can result in damage of the objects.

SUMMARY OF THE INVENTION

An embodiment of the invention is directed to a conveyor belt with flow control cleats including belting, first cleats and second cleats. The belting has a first side edge and a second side edge. The first cleats extend from the belting. The first cleats are oriented at an angle with respect to the first side edge of between about 30 degrees and about 60 degrees. The second cleats extend from the belting. The second cleats are oriented at an angle with respect to the second side edge of between about 30 degrees and about 60 degrees. The first cleats and the second cleats both include a first long cleat section, a second long cleat section, a short cleat section and a third long cleat section. The short cleat section has a length that is shorter than a length of the first long cleat section. The second long cleat section is between the first long cleat section and the short cleat section. The short cleat section is between the second long cleat section and the third long cleat section. A first recess is defined between second long cleat section of the first cleats, the third long cleat section of the second cleats, the short cleat section of the first cleats and the short cleat section of the second cleats.

Another embodiment of the invention is directed to a conveyor belt with flow control cleats including belting, first cleats and second cleats. The belting has a first side edge and a second side edge. The first cleats extend from the belting. The first cleats are oriented at an angle with respect to the first side edge of between about 30 degrees and about 60 degrees. The second cleats extend from the belting. The second cleats are oriented at an angle with respect to the second side edge of between about 30 degrees and about 60 degrees. The first cleats and the second cleats both include a first short cleat section, a first long cleat section, a second long cleat section and a second short cleat section. The first short cleat section has a length that is shorter than a length of the first long cleat section. The first long cleat section is between the first short cleat section and the second long cleat section. The second long cleat section is between the first long cleat section and the second short cleat section. A first recess is defined by the first long cleat section of the first cleats, the second long cleat section of the second cleats, the second long cleat section of the first cleats and the second short cleat section of the second cleats.

Another embodiment of the invention is directed to a conveyor belt with flow control cleats include belting, first cleats and second cleats. The belting has a first side edge and a second side edge. The first cleats extend from the belting. The first cleats are oriented at an angle with respect to the first side edge of between about 30 degrees and about 60 degrees. The second cleats extend from the belting. The second cleats are oriented at an angle with respect to the second side edge of between about 30 degrees and about 60 degrees. The first cleats and the second cleats both include a first cleat section, a second cleat section, a third cleat section, a fourth cleat section and fifth cleat section. The second cleat section is between the first cleat section and the third cleat section. The third cleat section is between the second cleat section and the fourth cleat section. The fourth cleat section is between the third cleat section and the fifth cleat section. A first recess is defined by the third cleat section and the fourth cleat section of the first cleats, the third cleat section and fourth cleat section of the second cleats, the fifth cleat section of the first cleats and the fifth cleat section of the second cleats.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
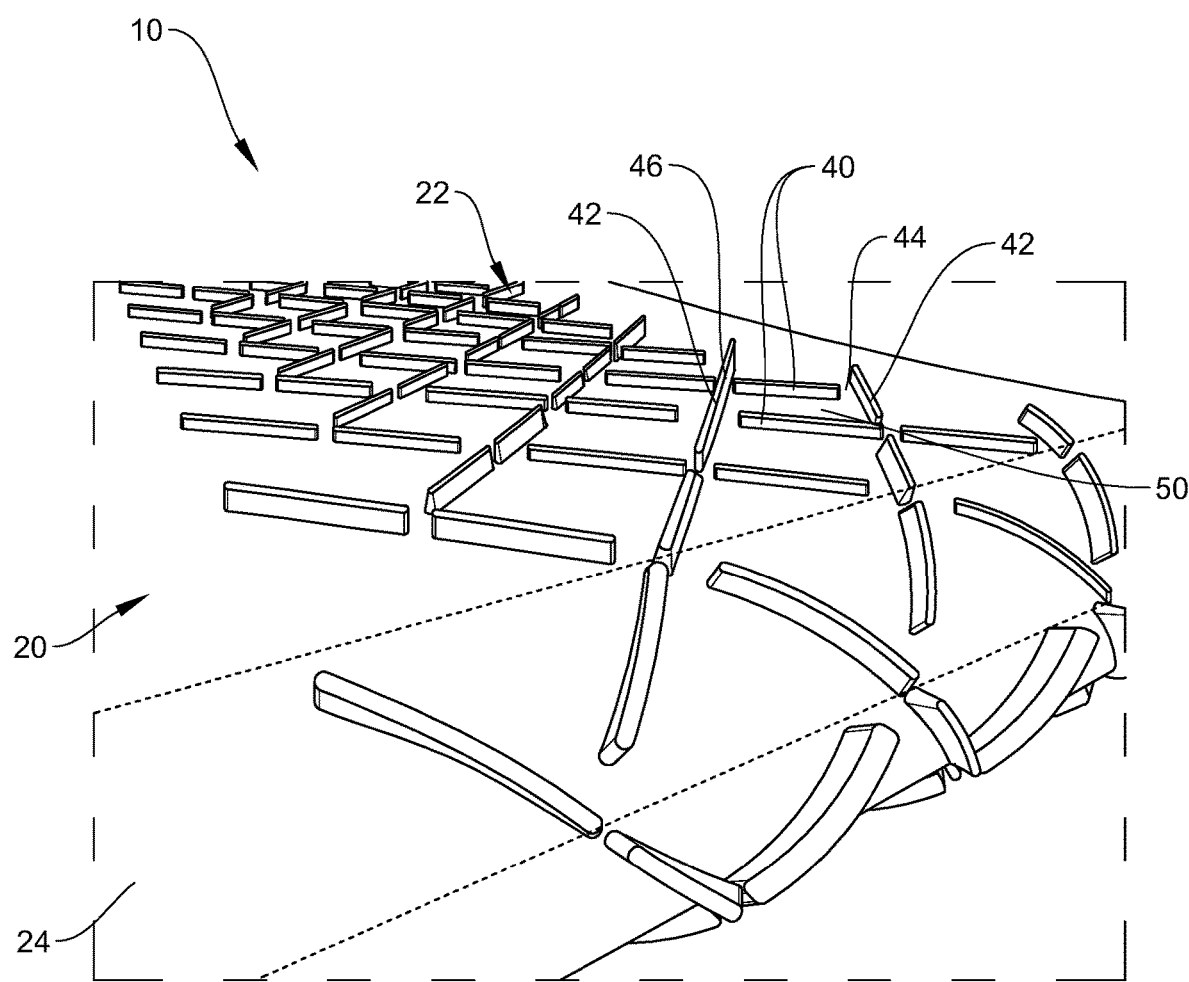
FIG. 1 is a perspective view of a conveyor belt with flow control cleats where the conveyor belt is moving around a roller at an end of the conveyor.
Figure 2:
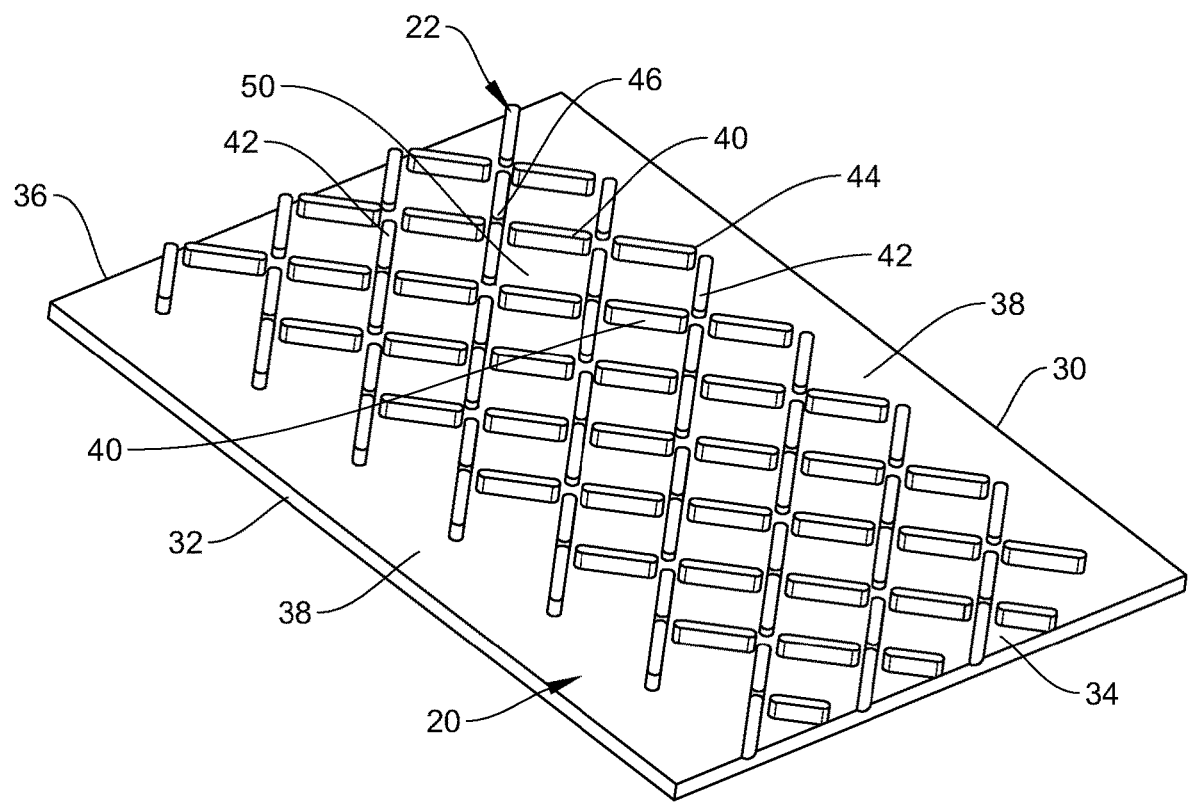
FIG. 2 is a top view of the conveyor belt with cleats having a first height.
Figure 3:
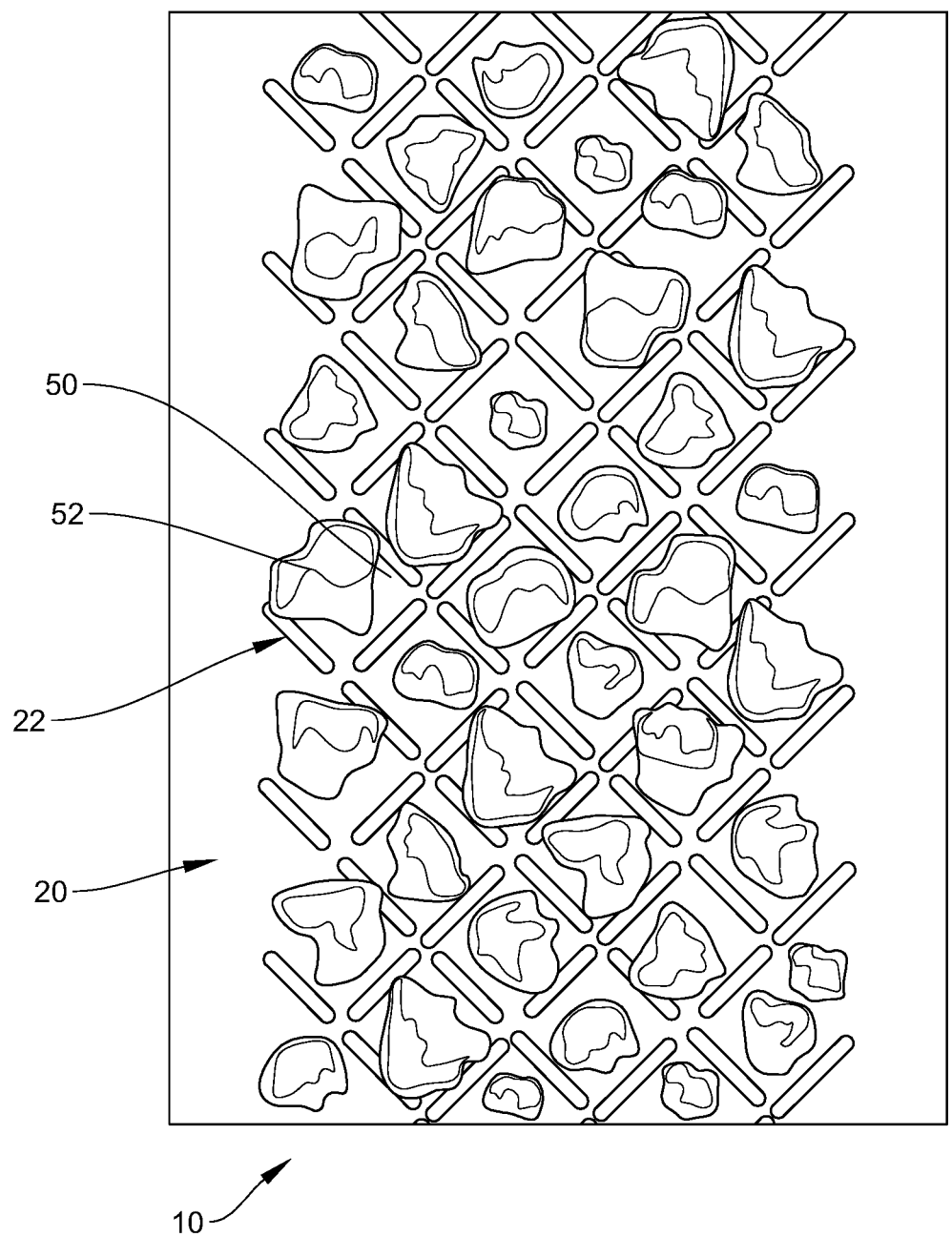
FIG. 3 is a top view of the conveyor belt with objects placed thereon.

An embodiment of the invention is directed to a conveyor belt with flow control cleats as illustrated at 10 in FIGS. 1-3. The conveyor belt 10 has enhanced properties as compared to prior art conveyor belts, an example of one such prior art conveyor belt cleat configuration is set forth in FIG. 4. The configuration of the cleats 40, 42 on the conveyor belt 10 illustrated in FIGS. 1-3 is particularly suited for cleats 40, 42 having a relatively short height such as about ½ of an inch.

Figure 4:
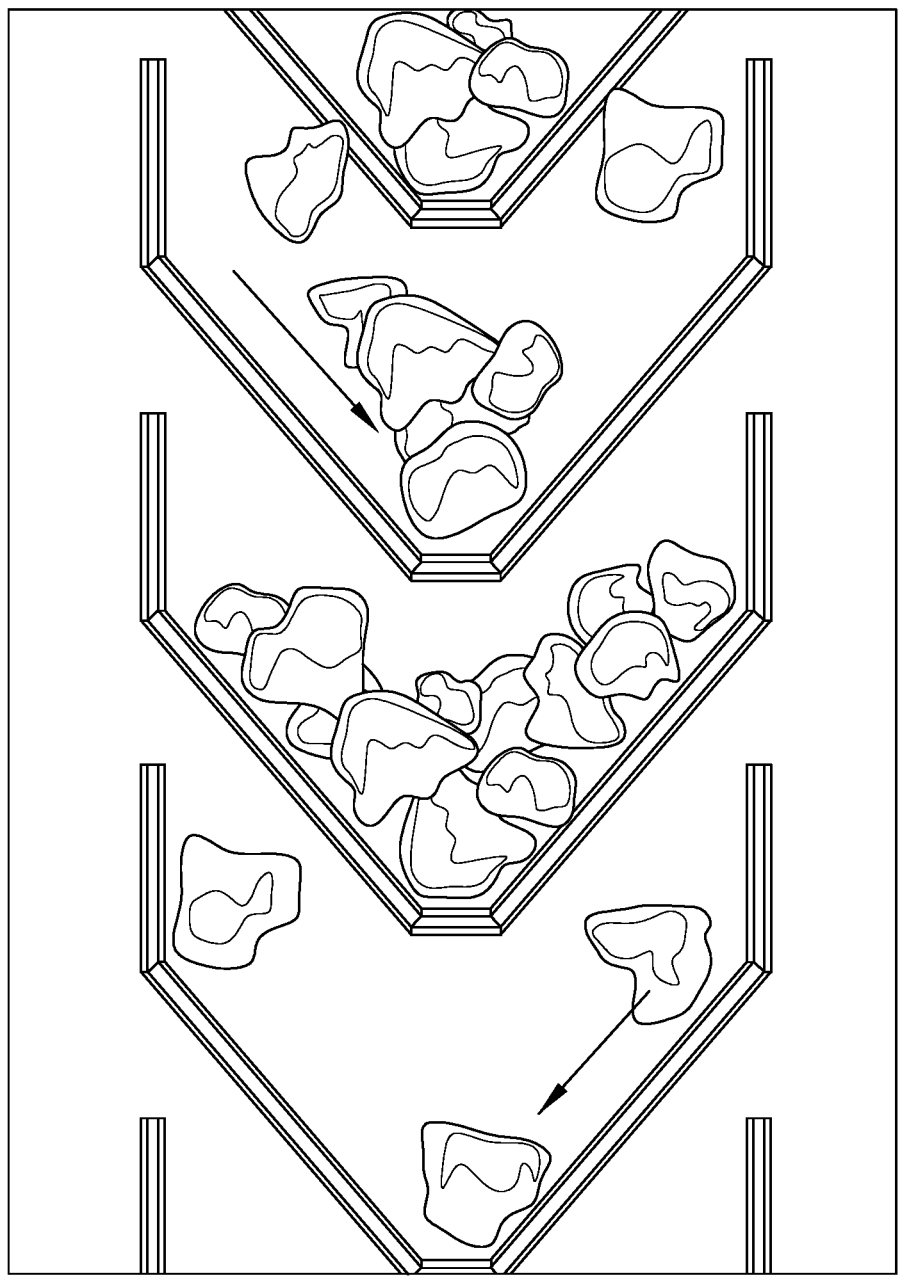
FIG. 4 is a top view of a prior art conveyor belt.

The conveyor belt 10 has an increased operational capacity as compared to prior art conveyors because the conveyor belt 10 facilitates placing more objects across a width of the conveyor belt as compared to prior art conveyor belts such as illustrated in FIG. 4.

The conveyor belt 10 reduces movement of objects placed thereon by retaining the objects in place on the conveyor belt 10. The cleat configuration also reduces spill back of the objects. These traits reduce abrasion of the upper surface of the belting, which increases the useful life of the conveyor belt 10.

As is described in more detail herein, the cleat pattern enhances contact of the belt with the rollers at opposite ends of the conveyor belt 10, which provides a smoother return of the belting. The cleat pattern also reduces chatter during the operation of the conveyor. The cleat pattern provides reduced rolling resistance and decreased horsepower requirements while facilitating the use of lighter yet stronger and more flexible belting.

The conveyor belt 10 generally includes belting 20 to which the plurality of cleats 40, 42 is attached. The belting 20 includes a first side edge 30 and a second side edge 32, which may be oriented generally parallel to the first side edge 30.

The belting 20 is defined by a leading end 34 and a trailing end 36. The leading end 34 is located in a direction in which the belting 20 typically moves. The trailing end 36 is opposite the leading end 34.

The belting 20 generally include two primary components: (1) a fabric layer and (2) a rubber layer. The type of the fabric layer as well as the thickness of the fabric layer is selected based upon the material that is intended to be transported using the conveyor belt 10 as well as the volume of material that is intended to be transported on the conveyor belt 10.

There are two primary techniques in which the fabric layer is coated with rubber-skim coating and friction coating. With skim coating, a layer of rubber material is laid on the fabric layer but is not forced into the weave on the fabric layer. In contrast, friction coating applies rubber to a fabric layer using a calender with rolls running at different surface speeds to urge the rubber into the weave on the fabric layer. It is also possible to use the concepts of this invention with uncoated fabric.

While skim coating is typically viewed as being suitable for use in conjunction with a variety of fabrics, the layer of rubber provided by skim coating is typically much thicker than the layer of rubber that is provided by friction coating.

The thicker rubber layer produced from skim coating increases the weight of the conveyor belt on which the skim coat is used. This extra weight may restrict the capacity of the conveyor belt that contains the skim-coated rubber. Alternatively, the components of the conveyor belt that contains the skim-coated rubber may need to be fabricated with a higher capacity.

Depending on the intended use of the belting material, it is possible to coat one or both of the fabric layer surfaces with rubber. It is also possible to use different coating techniques during the coating process. For example, friction coating may be used on one side of the fabric layer and skim coating may be used on the other side of the fabric layer.

While it is possible for the concepts of the invention to be used in conjunction with various rubber compositions, in certain embodiments, the rubber coating contains styrene butadiene rubber as a primary rubber component.

Prior to coating the fabric layer with rubber, the fabric layer may be treated to enhance the rubber adhesion, an example of which includes applying a layer of resorcinol formaldehyde latex to the surface of the fabric layer. After the rubber has been coated on the fabric layer, it is possible to use additional techniques to increase the strength and/or durability of the rubber, examples of which include pressure and heat, which is conventionally referred to as vulcanizing.

The cleats 40, 42 may be attached to the belting 20 either during the process of fabricating the conveyor belt 10 or may be attached to the belting 20 after fabrication. Integrally molding the cleats 40, 42 to the belting 20 may enhance adhesion of the cleats 40, 42 to the belting 20 and reduce the potential of delamination or cleat separation.

Factors impacting the manner in which the cleats 40, 42 are attached to the belting 20 include the materials from which the cleats 40, 42 are fabricated and the likely need to replace the cleats 40, 42 during the useful life of the conveyor belt 10.

The cleats 40, 42 are positioned to extend at least partially between the first side edge 30 and the second side edge 32. In certain embodiments, an edge region 38 of the belting 20 proximate the first side edge 30 and the second side edge 32 does not have any cleats extending therefrom. Each edge region 38 may be up to about 20 percent of the width of the belting 20. In certain embodiments, each edge region 38 has a width of about 10 percent of the width of the belting 20.

The cleats may generally include a first cleat 40 and a second cleat 42. In certain embodiments, the first cleat 40 may be oriented generally perpendicular to the second cleat 42. A person of skill in the art will appreciate that the orientation of the first cleat 40 and the second cleat 42 with respect to each other may be varied using the concepts of the invention.

Additionally, while it is illustrated that the first cleats 40 and the second cleats 42 have a similar length, it is possible for the first cleat 40 and the second cleat 42 to be formed with different lengths.

While it is illustrated that the first cleats 40 and the second cleats 42 are both substantially straight, it is possible for at least one of the first cleat 40 and the second cleat 42 to have other shapes.

While it is illustrated that a surface of the first cleats 40 and the second cleats 42 is relatively smooth, it is possible for the concepts of the invention to be adapted to utilize textured surfaces on at least one of the first cleat 40 and the second cleat 42. Such textured surface would engage the surface of the object 52 and thereby further reduce movement of the object 52 with respect to the conveyor belt 10.

A plurality of the first cleats 40 may be positioned in a generally linear configuration. The cleats may include a plurality of lines of the first cleats 40. The lines of the first cleats 40 are positioned in a spaced-apart configuration. In certain embodiments, a line spacing between adjacent lines of the first cleats 40 may be approximately equal.

The first cleats 40 are positioned so that an end spacing 44 is provided between ends of adjacent first cleats 40. The end spacing between the ends of the adjacent first cleats 40 may be considerably less than a length of each of the first cleats 40.

In certain embodiments, the end spacing 44 between the ends of the adjacent first cleats 40 may be up to about 10 percent of the length of each of the first cleats 40. In other embodiments, the end spacing between the ends of the adjacent first cleats 40 may be about 5 percent of the length of each of the first cleats 40.

The line of the first cleats 40 may be oriented at an angle of between about 30 degrees and about 60 degrees with respect to the first side edge 30. In certain embodiments, the angle of the line of the first cleats 40 may be about 45 degrees with respect to the first side edge 30. In certain embodiments, the line of the first cleats 40 may be oriented when moving from the first side edge 30 to the second side edge 32 in a direction that is towards the leading end 34.

Similarly, a plurality of the second cleats 42 may be positioned in a generally linear configuration. There may be a plurality of lines of the second cleats 42. The lines of the second cleats 42 are positioned in a spaced-apart configuration. In certain embodiments, the line spacing between adjacent lines of the second cleats 42 is approximately equal. Additionally, the line spacing between the adjacent lines of the first cleat 40 may be approximately the same as the line spacing between the adjacent lines of the second cleats 42.

The second cleats 42 are positioned so that an end spacing 46 is provided between ends of adjacent second cleats 42. The end spacing between the ends of the adjacent second cleats 42 may be considerably less than a length of each of the second cleats 42.

In certain embodiments, the end spacing 46 between the ends of the adjacent second cleats 42 may be up to about 10 percent of the length of each of the second cleats 42. In other embodiments, the end spacing between the ends of the adjacent second cleats 42 is about 5 percent of the length of each of the second cleats 42.

The line of the second cleats 42 may be oriented at an angle of between about 30 degrees and about 60 degrees with respect to the second side edge 32. In certain embodiments, the angle of the line of the second cleats 42 may be about 45 degrees with respect to the second side edge 32. In certain embodiments, the line of the second cleat 42 is oriented when moving from the second side edge 32 to the first side edge 30 in a direction that is towards the leading end 34.

A person of skill in the art will appreciate that the concepts of the invention may be varied so that at least one of the first cleats 40 and the second cleats 42 are not aligned in a line as long as the first cleats 40 and the second cleats 42 define recesses 50 as described in more detail herein.

Two first cleats 40 that extend between two second cleats 42 define the recess 50. When the first cleats 40 are oriented at the angle of about 45 degrees with respect to the first side edge 30 and the second cleats 42 are oriented at the angle of about 45 degrees with respect to the second side edge 32, the recess 50 has a generally square shape. A person of skill in the art will appreciate that the concepts of the invention may be adapted for the recess 50 to have alternate shapes by changing the orientation of at least one of the first cleat 40 and the second cleat 42.

The recess 50 is adapted to at least partially receive an object 52 that is being transported on the conveyor belt 10 such that at least a portion of the object 52 at least partially rests on the belting 20. The first cleats 40 and the second cleats 42 that are adjacent to the recess 50 resist movement of the object 52 on the conveyor belt 10.

The recess 50 is selected with a size based upon the size of the object 52 that is intended to be used in conjunction with the conveyor belt 10. In certain embodiments, the object 52 has dimensions that are smaller than the spacing between adjacent first cleats 40 and/or adjacent second cleats 42.

In other embodiments, the object 52 has at least one dimension that is greater than the spacing between adjacent first cleats 40 and/or adjacent second cleats 42. In such situations, a portion of the object extends over at least one of the first cleats 40 and the second cleats 42.

A substantial portion of each object 52 fits within each recess 50. As used herein, a substantial portion of each object 52 fitting within each recess 50 means that greater than about 80 percent of a length of the object 52 fits within the recess 50 and greater than about 80 percent of a width of the object 52 fits within the recess 50. Using the preceding configuration for the recess 50 minimizes the potential of the object 52 moving from the recess 50 once the object 52 is positioned in the recess 50

As illustrated in FIG. 3, the objects 52 may have irregular shapes meaning that the objects 52 do not have dimensions that are approximately equal in two generally perpendicular directions.

Therefore, the first cleats 40 and the second cleats 42 are selected so that the substantial portion of each object 52 fits within each recess 50. However, it will be appreciated that the object 52 may be positioned on the conveyor belt 10 in a variety of orientations that are not generally aligned with the first cleat 40 and/or the second cleat 42.

Notwithstanding, movement of the object 52 on the conveyor belt 10 is restricted by the first cleats 40 and the second cleats 42 that extend around the recess 50.

Because the substantial portion of each object 52 fits within each recess 50, the object 52 primarily rests on the surface of the belting 20 as opposed to resting on an upper surface of the cleat 40, 42. Such a configuration facilitates the cleat 40, 42 resisting movement of the object 52 with respect to the conveyor belt 10.

While it is illustrated that one object 52 is placed in each recess 50, it is possible for the concepts of the invention to be adapted so that more than one object 52 is placed in each recess 50.

The first cleat 40 and the second cleat 42 are formed with a height that is selected based upon the size of the objects 52 that are intended to be used with the conveyor belt 10. The height of the first cleat 40 and the second cleat 42 should be sufficiently high to substantially restrict the objects from unintentionally moving over the first cleat 40 and/or the second cleat 42. As referenced above, this embodiment of the invention is particularly suited for use with the first cleats 40 and the second cleats 42 each having a height of about ½ of an inch.

In certain embodiments, the height of the first cleat 40 and the second cleat 42 is at least about 5 percent of a height of the objects 52. In other embodiments, the height of the first cleat 40 and the second cleat 42 is at least about 10 percent of the height of the objects 52.

While it is illustrated that the first cleats 40 all have an approximately equal height, it is possible for at least a portion of the first cleats 40 to be formed with a different height using the concepts of the invention. Similarly, it is possible for at least a portion of the second cleats 42 to be formed with a different height using the concepts of the invention. Additionally, it is possible for the first cleats 40 to be formed with a height that is different than the second cleats 42.

A person of skill in the art will appreciate that because of the irregular shape of the objects, the terms height, width and length are arbitrary to the orientation of the object 52 at a particular time and changes when the orientation of the object 52 on the conveyor belt 10 changes.

The near end of FIG. 1 illustrates the conveyor belt 10 passing around a roller 24, which is identified by two sets of dashed lines. Because the cleats are separated into a plurality of first cleats 40 and second cleats 42, the first cleats 40 pivot away from each other when the conveyor belt 10 passes around the roller 24 and the second cleats 42 pivot away from each other when the conveyor belt 10 passes around the roller 24.

This configuration thereby provides a smoother return of the belting 20 and puts less strain on the components of the conveyor belt 10 and thereby enhances the anticipated life of the conveyor belt 10. The cleat configuration of this invention also reduces chatter not only during the movement of the belting 20 but also as the belting 20 passes around the roller 24.

Another benefit of the cleat configuration of this invention is that the cleat configuration reduces rolling resistance of the belting 20, which decreases the horsepower requirements of the motor used to move the belting 20.

In use, the objects 52 are placed onto the conveyor belt 10 and as the conveyor belt 10 is moved, the objects 52 become positioned into the recesses 50 as illustrated in FIG. 3. The conveyor belt 10 may be selected with a recess 50 size so that one of the objects 52 is in each of the recesses 50. A substantial portion of each object 52 is in each of the recesses 50 as described above.

As the conveyor belt 10 moves, the first cleats 40 and the second cleats 42 that define the recesses 50 substantially restrict movement of the objects 52 with respect to the conveyor belt 10. Restricting movement of the objects 52 with respect to the conveyor belt 10 minimizes damage to the objects causes by objects 52 contact each other. Restricting movement of the objects 52 with respect to the conveyor belt 10 also reduces abrasive damage to the surfaces of the belting 20 and the cleats 40, 42 caused by movement of the objects 52.

Additionally, restricting movement of the objects 52 with respect to the conveyor belt 10 increases the amount of objects 52 that may be positioned across the width of the conveyor belt 10 while reducing the potential of the objects falling off the edges of the conveyor belt 10.

Figure 5:
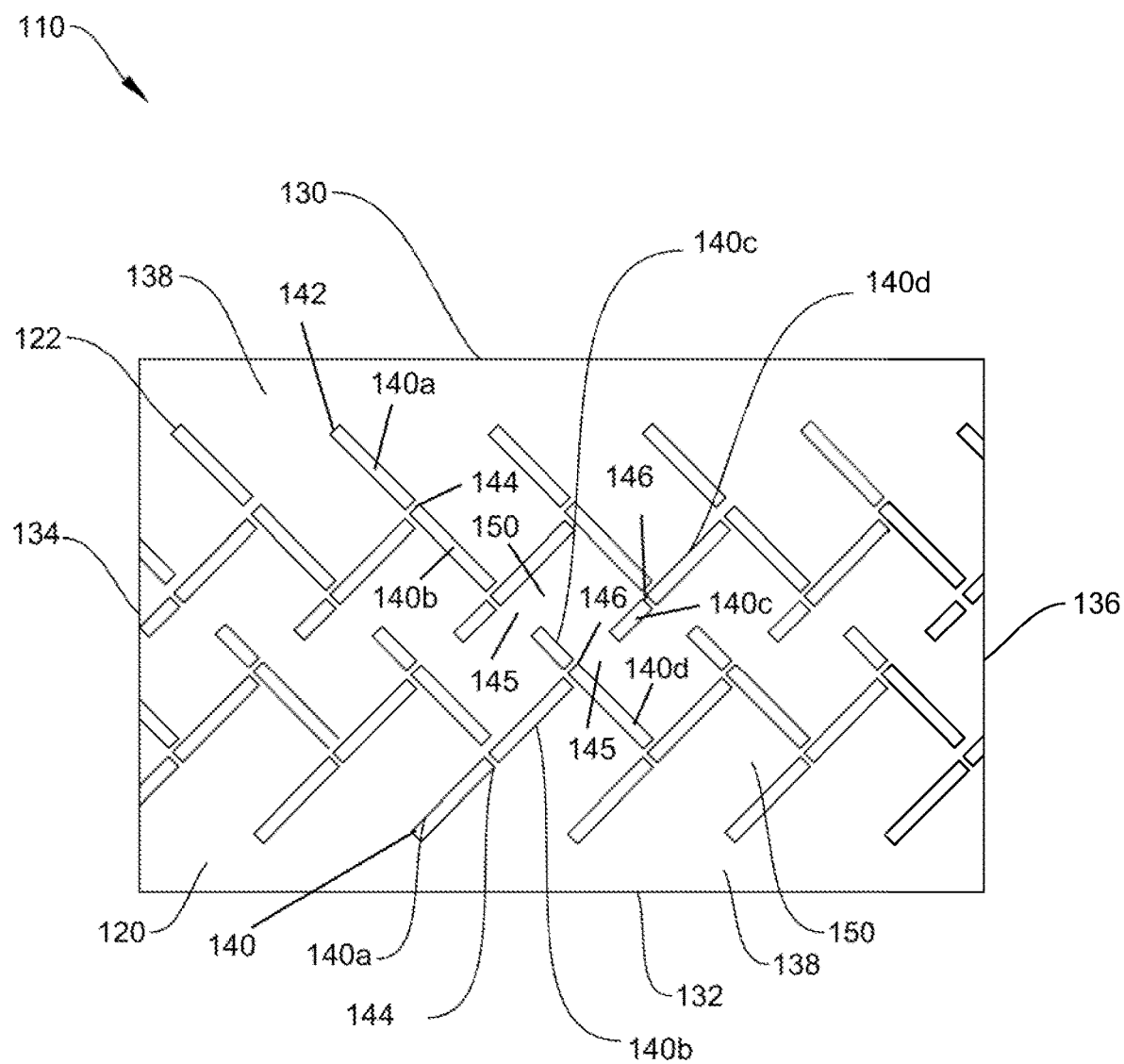
FIG. 5 is a top view of a conveyor belt according to an alternative embodiment with cleats having a second height that is greater than the first height.

Another embodiment of the invention is directed to a conveyor belt with flow control cleats as illustrated at 110 in FIG. 5. Unless indicated otherwise, the configuration of the conveyor belt 110 is similar to the configuration of the conveyor belt 10 illustrated in FIGS. 1-3.

The conveyor belt 110 has enhanced properties as compared to prior art conveyor belts, an example of one such prior art conveyor belt cleat configuration is set forth in FIG. 4. The configuration of the cleats 140, 142 on the conveyor belt 110 illustrated in FIG. 5 is particularly suited for cleats 140, 142, which while being longer than the cleats 10 illustrated in FIGS. 1-3, have a relatively short height such as about ¾ of an inch.

As such, this embodiment of the conveyor belt 110 is adapted for use in conjunction with objects having a larger size than the embodiment of the conveyor belt 10 illustrated in FIGS. 1-3.

The conveyor belt 110 has an increased operational capacity as compared to prior art conveyors because the conveyor belt 110 facilitates placing more objects across a width of the conveyor belt as compared to prior art conveyor belts such as illustrated in FIG. 4.

The conveyor belt 110 reduces movement of objects placed thereon by retaining the objects in place on the conveyor belt 110. The cleat configuration also reduces spill back of the objects. These traits reduce abrasion of the upper surface of the belting, which increases the useful life of the conveyor belt 110.

Similar to the embodiment described with respect to FIG. 1-3, the cleat pattern enhances contact of the belt with the rollers at opposite ends of the conveyor belt 110, which provides a smoother return of the belting. The cleat pattern also reduces chatter during the operation of the conveyor. The cleat pattern provides reduced rolling resistance and decreased horsepower requirements while facilitating the use of lighter yet stronger and more flexible belting.

The conveyor belt 110 generally includes belting 120 to which the plurality of cleats 140, 142 is attached. The belting 120 includes a first side edge 130 and a second side edge 132, which may be oriented generally parallel to the first side edge 130.

The belting 120 is defined by a leading end 134 and a trailing end 136. The leading end 134 is located in a direction in which the belting 120 typically moves. The trailing end 136 is opposite the leading end 134.

The cleats 140, 142 are positioned to extend at least partially between the first side edge 30 and the second side edge 132. In certain embodiments, an edge region 138 of the belting 120 proximate the first side edge 130 and the second side edge 132 does not have any cleats 140, 142 extending therefrom. Each edge region 138 may be up to about 20 percent of the width of the belting 120. In certain embodiments, each edge region 138 has a width of about 10 percent of the width of the belting 120.

In certain embodiments, the first cleats 140 may be oriented generally perpendicular to the second cleats 142. A person of skill in the art will appreciate that the orientation of the first cleats 140 and the second cleats 142 with respect to each other may be varied using the concepts of the invention.

While it is illustrated that the first cleats 140 and the second cleats 142 are both substantially straight, it is possible for at least one of the first cleats 140 and the second cleats 142 to have a non-linear shape.

The first cleats 140 may be positioned in a generally linear configuration. In certain embodiments, there are a plurality of lines of the first cleats 140 that are positioned in a spaced-apart configuration. A line spacing between adjacent lines of the first cleats 140 may be approximately equal.

The first cleats 140 may be oriented at an angle of between about 30 degrees and about 60 degrees with respect to the first side edge 130. In certain embodiments, the angle of the first cleats 140 may be about 45 degrees with respect to the first side edge 130. In certain embodiments, the first cleats 140 may be oriented when moving from the first side edge 130 to the second side edge 132 in a direction that is towards the leading end 134.

Similarly, the second cleats 142 may be positioned in a generally linear configuration. In certain embodiments, there are a plurality of lines of the second cleats 142 that are positioned in a spaced-apart configuration. A line spacing between adjacent lines of the second cleats 142 may be approximately equal. In certain embodiments, the line spacing between the adjacent lines of the second cleats 142 is approximately equal to the line spacing between the adjacent lines of the first cleats 140.

The second cleats 142 may be oriented at an angle of between about 30 degrees and about 60 degrees with respect to the second side edge 132. In certain embodiments, the angle of the second cleats 142 may be about 45 degrees with respect to the second side edge 132. In certain embodiments, the second cleats 142 may be oriented when moving from the second side edge 132 to the first side edge 130 in a direction that is towards the leading end 134.

Because the configuration of the first cleats 140 and the second cleats 142 may be substantially similar, the configuration of the cleat sections below applies to the first cleats 140 and the second cleats 142.

In contrast to the embodiment illustrated in FIGS. 1 and 2 where the first cleats 40 and the second cleats 42 all have a length that is approximately equal, the first cleats 140 and the second cleats 142 may include short cleat sections and long cleat sections. The short cleat sections have a length that is considerably shorter than a length of the long cleat sections. In certain embodiments, the short cleat sections have a length that is about 50 percent of a length of the long cleat sections.

In one configuration, the first cleats 140 and the second cleats 142 each include a first long cleat section 140*a*, a second long cleat section 140*b*, a short cleat section 140*c* and a third long cleat section 140*d* that are in a generally linear configuration. In certain embodiments, the first long cleat section 140*a*, the second long cleat section 140*b* and the third long cleat section 140*d* each have a substantially similar length. The short cleat section 140*c* may have a length that is about 50 percent of the length of the first long cleat section 140*a*, the second long cleat section 140*b* and the third long cleat section 140*d*.

The second long cleat section 140*b* is between the first long cleat section 140*a* and the short cleat section 140*c*. The short cleat section 140*c* is between the second long cleat section 140*b* and the third long cleat section 140*d*.

A first end spacing 144 is provided between adjacent ends of the first long cleat section 140*a* and the second long cleat section 140*b*. The first end spacing 144 may be considerably less than the length of the first long cleat section 140*a* and the second long cleat section 140*b*.

In certain embodiments, the first end spacing 144 may be up to about 10 percent of the length of the first long cleat section 140*a* and the second long cleat section 140*b*. In other embodiments, the first end spacing 144 may be about 5 percent of the length of the first long cleat section 140*a* and the second long cleat section 140*b*.

A second end spacing 145 is provided between adjacent ends of the second long cleat section 140*b* and the short cleat section 140*c*. The second end spacing 145 is larger than the first end spacing 144. In certain embodiments, the second end spacing 145 is approximately equal to the length of the short cleat section 140*c*.

A third end spacing 146 is provided between adjacent ends of the short cleat section 140*c* and the third long cleat section 140*d*. In certain embodiments, the third end spacing 146 is approximately equal to the first end spacing 144.

In certain embodiments, the second end spacing 145 of the first cleats 140 is proximate the third end spacing 146 of the second cleats 142. Similarly, the second end spacing 145 of the second cleats 142 is proximate the third end spacing 146 of the first cleats 140.

In certain embodiments, an end of the third long cleat section 140*d* that is opposite the third end spacing 146 in the first cleats 140 is proximate the first end spacing 146 in the second cleats 142. Similarly, an end of the third long cleat section 140*d* that is opposite the third end spacing 146 in the second cleats 142 is proximate the first end spacing 146 in the first cleats 140.

When the first cleats 140 and the second cleats 142 are in this configuration, a recess 150 is defined by the second long cleat section 140*b* of the first cleats 140, the third long cleat section 140*d* of the second cleats 142, the short cleat section 140*c* of the first cleats 140 and the short cleat section 140*c* of the second cleats 142.

Similarly, a recess 150 is defined by the second long cleat section 140*b* of the second cleats 142, the third long cleat section 140*d* of the first cleats 140, the short cleat section 140*c* of the second cleats 142 and the short cleat section 140*c* of the first cleats 140.

The recess 150 is adapted to at least partially receive an object 52 (illustrated in FIG. 3) that is being transported on the conveyor belt 110 such that at least a portion of the object 52 is in contact with the belting 120. The first cleats 140 and the second cleats 142 that are adjacent to the recess 150 resist movement of the object 52 on the conveyor belt 110.

The recess 150 is selected with a size based upon the size of the object 52 that is intended to be used in conjunction with the conveyor belt 110. In certain embodiments, the object 52 has dimensions that are smaller than the line spacing between adjacent first cleats 140 and/or adjacent second cleats 142.

In other embodiments, the object 52 has at least one dimension that is greater than the line spacing between adjacent first cleats 140 and/or adjacent second cleats 142. In such situations, a portion of the object 52 extends over at least one of the first cleats 140 and the second cleats 142.

A substantial portion of each object 52 should fit within each recess 150. As used herein, a substantial portion of each object 52 fitting within each recess 150 means that greater than about 80 percent of a length of the object 52 fits within the recess 150 and greater than about 80 percent of a width of the object 52 fits within the recess 150. Using the preceding configuration for the recess 150 minimizes the potential of the object 52 moving from the recess 150 once the object 52 is positioned in the recess 150.

Because the substantial portion of each object 52 fits within each recess 150, the object 52 primarily rests on the surface of the belting 120 as opposed to resting on an upper surface of the first cleats 140 and the second cleats 142. Such a configuration facilitates the first cleats 140 and the second cleats 142 resisting movement of the object 52 with respect to the conveyor belt 110.

While it is illustrated that one object 52 is placed in each recess 50, it is possible for the concepts of the invention to be adapted so that more than one object is placed in each recess 150.

Because the cleat length is determined based upon the size of the objects 52 that are anticipated to be placed on the conveyor belt 110, a width of the conveyor belt 110 may need to be wider to increase the amount of object 52 that can be conveyed with the conveyor belt 110, it is possible to replicate the configuration of the first cleats 140 and the second cleats 142 intermediate the first edge 130 and the second edge 132.

The first cleats 140 and the second cleats 142 are formed with a height that is selected based upon the size of the objects 52 that are intended to be used with the conveyor belt 110. The height of the first cleats 140 and the second cleats 142 should be sufficiently high to substantially restrict the objects from unintentionally moving over the first cleats 140 and/or the second cleats 142. As referenced above, in this embodiment of the conveyor belt 110, the first cleats 140 and the second cleats 142 both have a height of about ¾ of an inch.

In certain embodiments, the height of the first cleats 140 and the second cleats 142 is at least about 5 percent of a height of the objects 52. In other embodiments, the height of the first cleats 140 and the second cleats 142 is at least about 10 percent of the height of the objects 52.

While it is illustrated that the first cleats 140 all have an approximately equal height, it is possible for at least a portion of the first cleats 140 to be formed with a different height using the concepts of the invention. Similarly, it is possible for at least a portion of the second cleats 142 to be formed with a different height using the concepts of the invention. Additionally, it is possible for the first cleats 140 to be formed with a height that is different than the second cleats 142.

A person of skill in the art will appreciate that because of the irregular shape of the objects, the terms height, width and length are arbitrary to the orientation of the object 52 at a particular time and changes when the orientation of the object 52 on the conveyor belt 110 changes.

Because the cleats are separated into a plurality of first cleats 140 and second cleats 142, the first cleats 140 pivot away from each other when the conveyor belt 110 passes around the roller 24 (illustrated in FIG. 1) and the second cleats 142 pivot away from each other when the conveyor belt 110 passes around the roller 24.

This configuration thereby provides a smoother return of the belting 120 and puts less strain on the components of the conveyor belt 110 and thereby enhances the anticipated life of the conveyor belt 110. The cleat configuration of this invention also reduces chatter not only during the movement of the belting 120 but also as the belting 120 passes around the roller 24.

Use of the conveyor belt 110 of this embodiment is similar to the use of the conveyor belt 10 described above with respect to FIGS. 1-3. However, this embodiment is better suited for use with objects having a larger size than the objects 52 used in conjunction with the conveyor belt 10.

Figure 6:
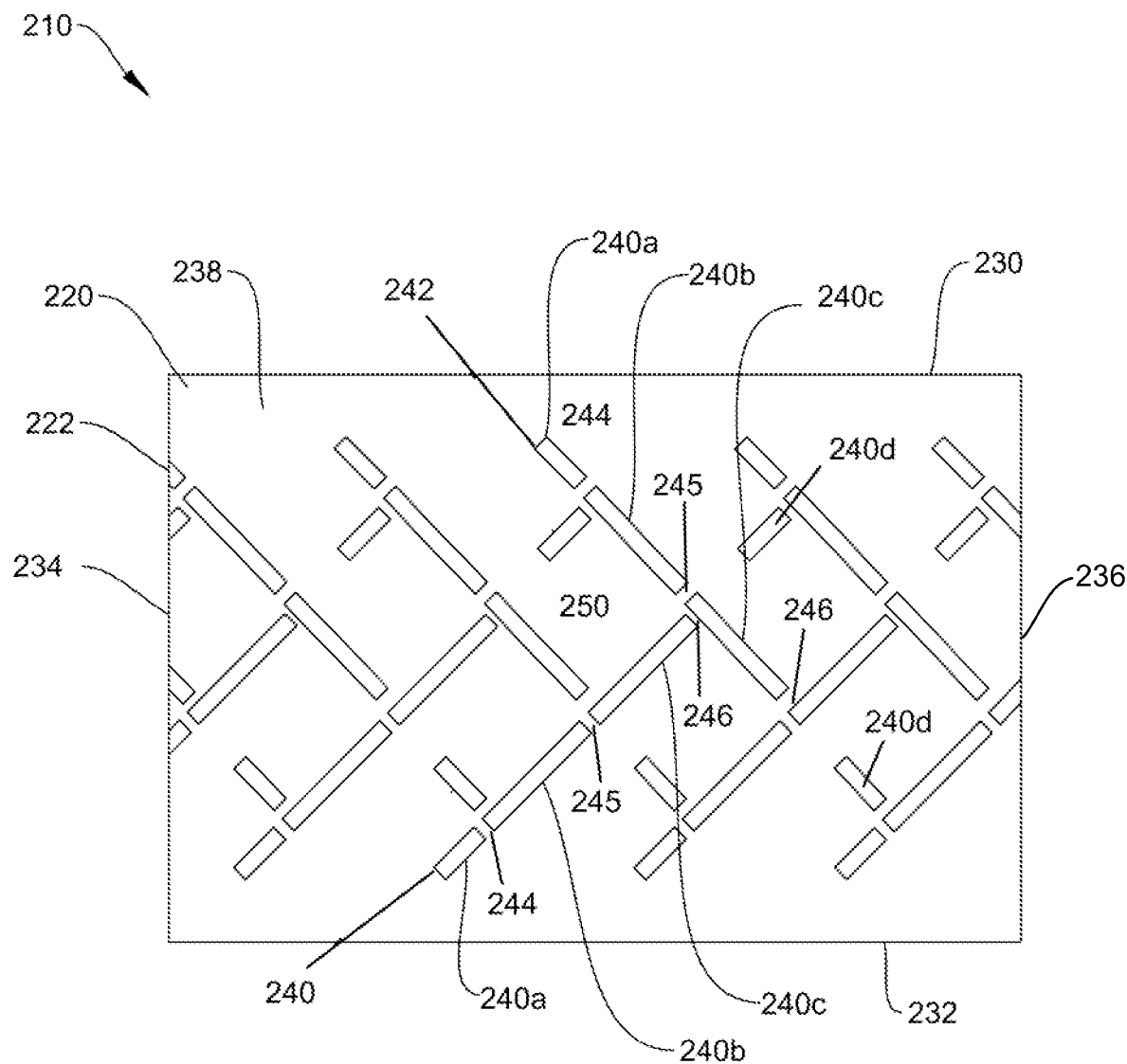
FIG. 6 is a top view of a conveyor belt according to another alternative embodiment with cleats having a third height that is greater than the second height.

Another embodiment of the invention is directed to a conveyor belt with flow control cleats as illustrated at 210 in FIG. 6. Unless indicated otherwise, the configuration of the conveyor belt 210 is similar to the configuration of the conveyor belt 10 illustrated in FIGS. 1-3.

The conveyor belt 210 has enhanced properties as compared to prior art conveyor belts, an example of one such prior art conveyor belt cleat configuration is set forth in FIG. 4. The configuration of the cleats 240, 242 on the conveyor belt 210 illustrated in FIG. 6 is particularly suited for cleats, which are taller than the cleats 40, 42 (FIGS. 1-3) 140, 142 FIG. 5), and have an intermediate height such as about 1 inch.

As such, this embodiment of the conveyor belt 210 is adapted for use in conjunction with objects having a larger size than the embodiment of the conveyor belt 10 illustrated in FIGS. 1-3 as well as the embodiment of the conveyor belt 110 illustrated in FIG. 5. The conveyor belt 210 is also adapted for use in conjunction with a larger volume of objects that the embodiment of the conveyor belt 10 illustrated in FIGS. 1-3 as well as the conveyor belt 110 illustrated in FIG. 5.

The conveyor belt 210 has an increased operational capacity as compared to prior art conveyors because the conveyor belt 210 facilitates placing more objects across a width of the conveyor belt as compared to prior art conveyor belts such as illustrated in FIG. 4.

The conveyor belt 210 reduces movement of objects placed thereon by retaining the objects in place on the conveyor belt 210. The cleat configuration also reduces spill back of the objects. These traits reduce abrasion of the upper surface of the belting, which increases the useful life of the conveyor belt 210.

Similar to the embodiment described with respect to FIG. 1-3, the cleat pattern enhances contact of the belt with the rollers at opposite ends of the conveyor belt 210, which provides a smoother return of the belting. The cleat pattern also reduces chatter during the operation of the conveyor. The cleat pattern provides reduced rolling resistance and decreased horsepower requirements while facilitating the use of lighter yet stronger and more flexible belting.

The conveyor belt 210 includes belting 220 to which the plurality of cleats 240, 242 is attached. The belting 220 includes a first side edge 230 and a second side edge 232, which may be oriented generally parallel to the first side edge 230.

The belting 220 is defined by a leading end 234 and a trailing end 236. The leading end 234 is located in a direction in which the belting 220 typically moves. The trailing end 236 is opposite the leading end 234.

The cleats 240, 242 are positioned to extend at least partially between the first side edge 230 and the second side edge 232. In certain embodiments, an edge region 238 of the belting 220 proximate the first side edge 230 and the second side edge 232 does not have any cleats 240, 242 extending therefrom. Each edge region 238 may be up to about 20 percent of the width of the belting 220. In certain embodiments, each edge region 238 has a width of about 10 percent of the width of the belting 220.

In certain embodiments, the first cleats 240 may be oriented generally perpendicular to the second cleats 242. A person of skill in the art will appreciate that the orientation of the first cleats 240 and the second cleats 242 with respect to each other may be varied using the concepts of the invention.

While it is illustrated that the first cleats 240 and the second cleats 242 are both substantially straight, it is possible for at least one of the first cleats 240 and the second cleats 242 to have a non-linear other shape.

The first cleats 240 may be positioned in a generally linear configuration. In certain embodiments, there are a plurality of lines of the first cleats 240 that are positioned in a spaced-apart configuration. A line spacing between adjacent lines of the first cleats 240 may be approximately equal.

The first cleats 240 may be oriented at an angle of between about 30 degrees and about 60 degrees with respect to the first side edge 230. In certain embodiments, the angle of the first cleats 240 may be about 45 degrees with respect to the first side edge 230. In certain embodiments, the first cleats 240 may be oriented when moving from the first side edge 230 to the second side edge 232 in a direction that is towards the leading end 234.

Similarly, the second cleats 242 may be positioned in a generally linear configuration. In certain embodiments, there are a plurality of lines of the second cleats 242 that are positioned in a spaced-apart configuration. A line spacing between adjacent lines of the second cleats 242 may be approximately equal. In certain embodiments, the line spacing between the adjacent lines of the second cleats 242 is approximately equal to the line spacing between the adjacent lines of the first cleats 240.

The second cleats 242 may be oriented at an angle of between about 30 degrees and about 60 degrees with respect to the second side edge 232. In certain embodiments, the angle of the second cleats 242 may be about 45 degrees with respect to the second side edge 232. In certain embodiments, the second cleats 242 may be oriented when moving from the second side edge 232 to the first side edge 230 in a direction that is towards the leading end 234.

Because the configuration of the first cleats 240 and the second cleats 242 may be substantially similar, the configuration of the cleat sections below applies to the first cleats 240 and the second cleats 242.

In contrast to the embodiment illustrated in FIGS. 1 and 2 where the first cleat 40 and the second cleat 42 all have a length that is approximately equal, the first cleats 240 and the second cleats 242 may include short cleat sections and long cleat sections. The short cleat sections have a length that is considerably shorter than a length of the long cleat sections. In certain embodiments, the short cleat sections have a length that is between about 30 percent and about 50 percent of a length of the long cleat sections. In other embodiments, the length of short cleat sections is about 40 percent of the length of the long cleat sections.

In one configuration, the first cleats 240 and the second cleats 242 each include a first short cleat section 240a, a first long cleat section 240b, a second long cleat section 240c and a second short cleat section 240d that are in a generally linear configuration. In certain embodiments, the first long cleat section 240b and the second long cleat section 240c each have a substantially similar length. The first short cleat section 240a and the second short cleat section 240b may have a length that is about 40 percent of the length of the first long cleat section 240b and the second long cleat section 240c.

The first long cleat section 240b is between the first short cleat section 240a and the second long cleat section 240c. The second long cleat section 240c is between the first long cleat section 240b and the second short cleat section 240d.

A first end spacing 244 is provided between adjacent ends of the first short cleat section 240a and the first long cleat section 240b. The first end spacing 244 may be considerably less than the length of the first short cleat section 240a and the first long cleat section 240b.

In certain embodiments, the first end spacing 244 may be up to about 10 percent of the length of the first long cleat section 240b. In other embodiments, the first end spacing 244 may be about 5 percent of the length of the first long cleat section 240b.

A second end spacing 245 is provided between adjacent ends of the first long cleat section 240b and the second long cleat section 240c. In certain embodiments, the second end spacing 245 is approximately equal to the first end spacing 244.

A third end spacing 246 is provided between adjacent ends of the second long cleat section 240c and the second short cleat section 240d. The third end spacing 246 is larger than the first end spacing 244. In certain embodiments, the third end spacing 245 is approximately equal to the length of the second short cleat section 240d.

In certain embodiments, the second end spacing 245 of the first cleats 240 is proximate the third end spacing 246 of the second cleats 242. Similarly, the second end spacing 245 of the second cleats 242 is proximate the third end spacing 246 of the first cleats 240.

In certain embodiments, an end of the second short cleat section 240d that is opposite the third end spacing 246 in the first cleats 240 is proximate the first end spacing 246 in the second cleats 242. Similarly, an end of the second short cleat section 240d that is opposite the third end spacing 246 in the second cleats 242 is proximate the first end spacing 246 in the first cleats 240.

When the first cleats 240 and the second cleats 242 are in this configuration, a recess 250 is defined by the first long cleat section 240b of the first cleats 240, the second long cleat section 240c of the second cleats 242, the second long cleat section 240c of the first cleats 240 and the second short cleat section 240d of the second cleats 240.

Similarly, a recess 250 is defined by the first long cleat section 240b of the second cleats 242, the second long cleat section 240c of the first cleats 240, the second long cleat section 240c of the second cleats 242 and the second short cleat section 240d of the first cleats 242.

The recess 250 is adapted to at least partially receive an object 52 (illustrated in FIG. 3) that is being transported on the conveyor belt 210 such that at least a portion of the object 52 positioned on the belting 220. The first cleats 240 and the second cleats 242 that are adjacent to the recess 250 resist movement of the object 52 on the conveyor belt 210.

The recess 250 is selected with a size based upon the size of the object 52 that is intended to be used in conjunction with the conveyor belt 210. In certain embodiments, the object 52 has dimensions that are smaller than the line spacing between adjacent first cleats 240 and/or adjacent second cleats 242.

In other embodiments, the object 52 has at least one dimension that is greater than the line spacing between adjacent first cleats 240 and/or adjacent second cleats 242. In such situations, a portion of the object extends over at least one of the first cleats 240 and the second cleats 242.

A substantial portion of each object 52 should fit within each recess 250. As used herein, a substantial portion of each object 52 fitting within each recess 250 means that greater than about 80 percent of a length of the object 52 fits within the recess 250 and greater than about 80 percent of a width of the object 52 fits within the recess 250. Using the preceding configuration for the recess 250 minimizes the potential of the object 52 moving from the recess 250 once the object 52 is positioned in the recess 250.

Because the substantial portion of each object 52 fits within each recess 250, the object 52 primarily rests on the surface of the belting 220 as opposed to resting on an upper surface of the first cleats 240 and the second cleats 242. Such a configuration facilitates the first cleats 240 and the second cleats 242 resisting movement of the object 52 with respect to the conveyor belt 210.

While it is illustrated that one object 52 is placed in each recess 50, it is possible for the concepts of the invention to be adapted so that more than one object is placed in each recess 250.

Because the cleat length is determined based upon the size of the objects 52 that are anticipated to be placed on the conveyor belt 210, a width of the conveyor belt 210 may need to be wider to increase the amount of object 52 that can be conveyed with the conveyor belt 210, it is possible to replicate the configuration of the first cleats 240 and the second cleats 242 intermediate the first edge 230 and the second edge 232.

The first cleats 240 and the second cleats 242 are formed with a height that is selected based upon the size of the objects 52 that are intended to be used with the conveyor belt 210. The height of the first cleat 240 and the second cleat 242 should be sufficiently high to substantially restrict the objects from unintentionally moving over the first cleats 240 and/or the second cleats 242. As referenced above, in this embodiment of the conveyor belt 210, the first cleats 240 and the second cleats 242 both have a height of about 1 inch.

In certain embodiments, the height of the first cleats 240 and the second cleats 242 is at least about 5 percent of a height of the objects 52. In other embodiments, the height of the first cleats 240 and the second cleats 242 is at least about 10 percent of the height of the objects 52.

While it is illustrated that the first cleats 240 all have an approximately equal height, it is possible for at least a portion of the first cleats 240 to be formed with a different height using the concepts of the invention. Similarly, it is possible for at least a portion of the second cleats 242 to be formed with a different height using the concepts of the invention. Additionally, it is possible for the first cleats 240 to be formed with a height that is different than the second cleats 242.

A person of skill in the art will appreciate that because of the irregular shape of the objects, the terms height, width and length are arbitrary to the orientation of the object 52 at a particular time and changes when the orientation of the object 52 on the conveyor belt 210 changes.

Because the cleats are separated into a plurality of first cleats 240 and second cleats 242, the first cleats 240 pivot away from each other when the conveyor belt 210 passes around the roller 24 (illustrated in FIG. 1) and the second cleats 242 pivot away from each other when the conveyor belt 210 passes around the roller 24.

This configuration thereby provides a smoother return of the belting 220 and puts less strain on the components of the conveyor belt 210 and thereby enhances the anticipated life of the conveyor belt 210. The cleat configuration of this invention also reduces chatter not only during the movement of the belting 220 but also as the belting 220 passes around the roller 24.

Use of the conveyor belt 210 of this embodiment is similar to the use of the conveyor belt 10 described above with respect to FIGS. 1-3. However, this embodiment is better suited for use with objects having a larger size than the objects 52 used in conjunction with the conveyor belt 10 and a larger size than the objects used in conjunction with the conveyor belt 110 illustrated in FIG. 5.

Figure 7:
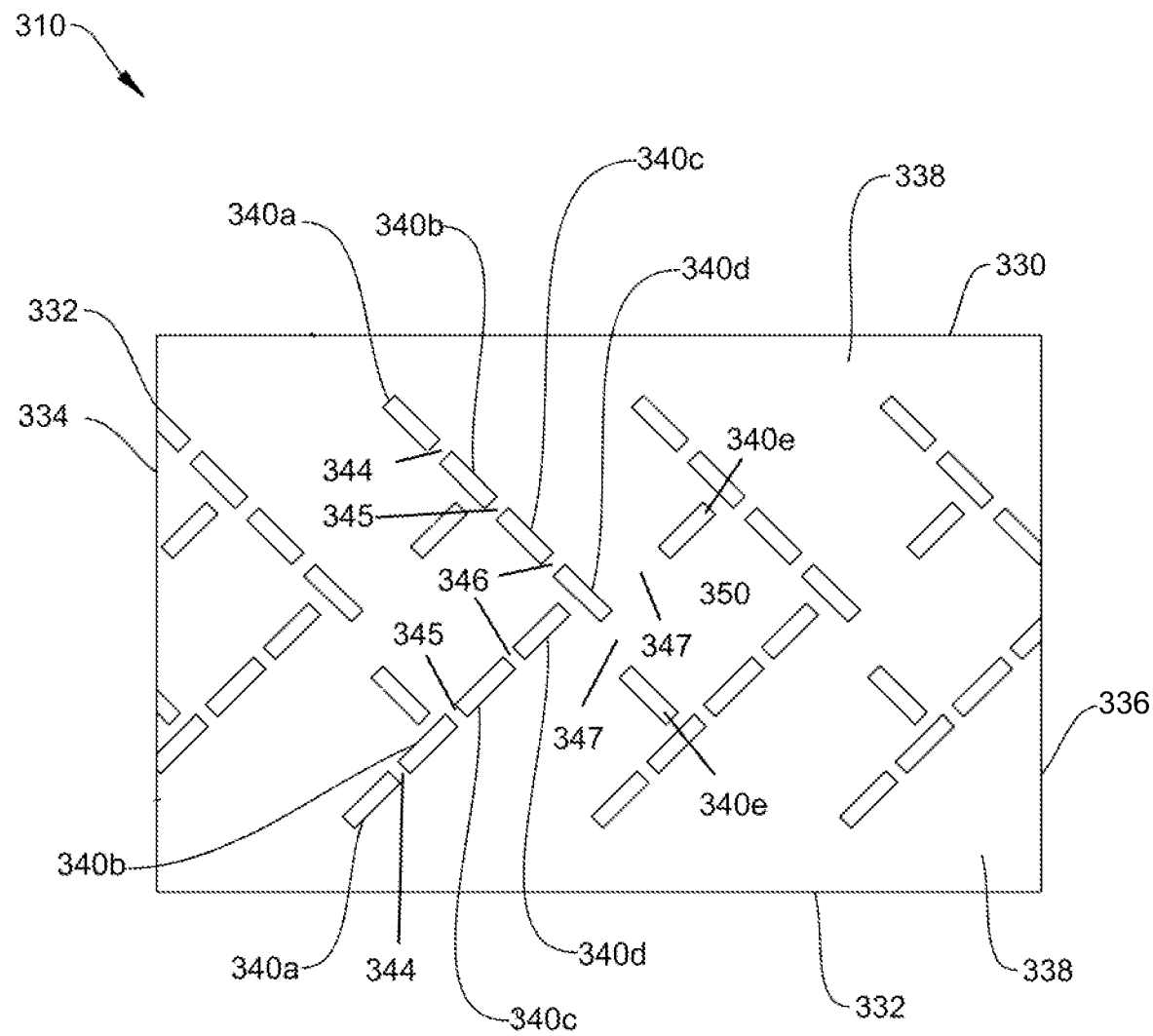
FIG. 7 is a top view of a conveyor belt according to another alternative embodiment with cleats having a fourth height that is greater than the third height.

Another embodiment of the invention is directed to a conveyor belt with flow control cleats as illustrated at 310 in FIG. 7. Unless indicated otherwise, the configuration of the conveyor belt 310 is similar to the configuration of the conveyor belt 10 illustrated in FIGS. 1-3.

The conveyor belt 310 has enhanced properties as compared to prior art conveyor belts, an example of one such prior art conveyor belt cleat configuration is set forth in FIG. 4. The configuration of the cleats 322 on the conveyor belt 310 illustrated in FIG. 7 is particularly suited for cleats 322 having a taller height such as about 1.5 inches.

As such, this embodiment of the conveyor belt 310 is adapted for use in conjunction with objects having a larger size than the embodiment of the conveyor belt 10 illustrated in FIGS. 1-3, the conveyor belt 110 illustrated in FIG. 5 and the conveyor belt illustrated in FIG. 6. The conveyor belt 310 is also adapted for use in conjunction with a larger volume of objects that the embodiment of the conveyor belt 10 illustrated in FIGS. 1-3 as well as the conveyor belt 110 illustrated in FIG. 5 and the conveyor belt 210 illustrated in FIG. 6.

The conveyor belt 310 has an increased operational capacity as compared to prior art conveyors because the conveyor belt 310 facilitates placing more objects across a width of the conveyor belt as compared to prior art conveyor belts such as illustrated in FIG. 4.

The conveyor belt 310 reduces movement of objects placed thereon by retaining the objects in place on the conveyor belt 310. The cleat configuration also reduces spill back of the objects. These traits reduce abrasion of the upper surface of the belting, which increases the useful life of the conveyor belt 310.

Similar to the embodiment described with respect to FIG. 1-3, the cleat pattern enhances contact of the belt with the rollers at opposite ends of the conveyor belt 310, which provides a smoother return of the belting. The cleat pattern also reduces chatter during the operation of the conveyor. The cleat pattern provides reduced rolling resistance and decreased horsepower requirements while facilitating the use of lighter yet stronger and more flexible belting.

The conveyor belt 310 includes belting 320 to which the plurality of cleats 340, 342 is attached. The belting 320 includes a first side edge 330 and a second side edge 332, which may be oriented generally parallel to the first side edge 330.

The belting 320 is defined by a leading end 334 and a trailing end 336. The leading end 334 is located in a direction in which the belting 320 typically moves. The trailing end 336 is opposite the leading end 334.

The cleats 340, 342 are positioned to extend at least partially between the first side edge 320 and the second side edge 332. In certain embodiments, an edge region 338 of the belting 320 proximate the first side edge 330 and the second side edge 332 does not have any cleats 340, 342 extending therefrom. Each edge region 338 may be up to about 20 percent of the width of the belting 320. In certain embodiments, each edge region 338 has a width of about 10 percent of the width of the belting 320.

In certain embodiments, the first cleat section 340 may be oriented generally perpendicular to the second cleat section 322. A person of skill in the art will appreciate that the orientation of the first cleat section 340 and the second cleat section 342 with respect to each other may be varied using the concepts of the invention.

While it is illustrated that the first cleat 340 and the second cleat 342 are both substantially straight, it is possible for at least one of the first cleat 340 and the second cleat 342 to have a non-linear shape.

The first cleats 340 may be positioned in a generally linear configuration. In certain embodiments, there are a plurality of lines of the first cleats 340 that are positioned in a spaced-apart configuration. A line spacing between adjacent lines of the first cleats 340 may be approximately equal.

The first cleats 340 may be oriented at an angle of between about 30 degrees and about 60 degrees with respect to the first side edge 330. In certain embodiments, the angle of the first cleats 340 may be about 45 degrees with respect to the first side edge 330. In certain embodiments, the first cleats 340 may be oriented when moving from the first side edge 330 to the second side edge 332 in a direction that is towards the leading end 334.

Similarly, the second cleats 342 may be placed in a generally linear configuration. In certain embodiments, there are a plurality of lines of the second cleats 342 that are positioned in a spaced-apart configuration. A line spacing between adjacent lines of the second cleats 342 may be approximately equal. In certain embodiments, the line spacing between the adjacent lines of the second cleats 342 is approximately equal to the line spacing between the adjacent lines of the first cleats 340.

The second cleats 342 may be oriented at an angle of between about 30 degrees and about 60 degrees with respect to the second side edge 332. In certain embodiments, the angle of the second cleats 342 may be about 45 degrees with respect to the second side edge 332. In certain embodiments, the second cleats 342 may be oriented when moving from the second side edge 332 to the first side edge 330 in a direction that is towards the leading end 334.

Because the configuration of the first cleats 340 and the second cleats 342 may be substantially similar, the configuration of the cleat sections below applies to the first cleats 340 and the second cleats 342.

In certain embodiments, the first cleats 340 and the second cleats 342 are all formed with a substantially similar length. In one configuration, the first cleats 340 and the second cleats 342 each include a first cleat section 340a, a second cleat section 340b, a third cleat section 340c, a fourth cleat section 340d and a fifth cleat section 340e that are in a generally linear configuration.

The second cleat section 340b is between the first cleat section 340a and the third cleat section 340c. The third cleat section 340c is between the second cleat section 340b and the fourth cleat section 340d. The fourth cleat section 340d is between the third cleat section 340c and the fifth cleat section 340e.

A first end spacing 344 is provided between adjacent ends of the first cleat section 340a and the second cleat section 340b. The first end spacing 344 may be considerably less than the length of the first cleat section 340a and the second cleat section 340b.

In certain embodiments, the first end spacing 344 may be up to about 20 percent of the length of the first cleat section 340a and the second cleat section 340b. In other embodiments, the first end spacing 344 may be about 10 percent of the length of the first cleat section 340a and the second cleat section 340b.

A second end spacing 345 is provided between adjacent ends of the second cleat section 340b and the third cleat section 340c. In certain embodiments, the second end spacing 345 is approximately equal to the first end spacing 344.

A third end spacing 346 is provided between adjacent ends of the third cleat section 340c and the fourth cleat section 340d. In certain embodiments, the third end spacing 346 is approximately equal to the first end spacing 344.

A fourth end spacing 347 is provided between adjacent ends of the fourth cleat section 340d and the fifth cleat section 340e. The fourth end spacing 347 is larger than the first end spacing 344. In certain embodiments, the fourth end spacing 347 is approximately equal to the length of the fifth cleat section 340e.

In certain embodiments, the fourth end spacing 347 of the first cleats 340 is proximate the fourth cleat section 340d of the second cleats 342. Similarly, the fourth end spacing 347 of the second cleats 342 is proximate the fourth cleat section 340d of the first cleats 340.

In certain embodiments, an end of the fifth cleat section 340e that is opposite the fourth end spacing 347 in the first cleats 340 is proximate the second cleat section 340b in the second cleats 342. Similarly, an end of the fifth cleat section 340e that is opposite the fourth end spacing 347 in the second cleats 342 is proximate the second cleat section 340b in the first cleats 140.

When the first cleats 340 and the second cleats 342 are in this configuration, a recess 350 is defined by the third cleat section 340b and the fourth cleat section 340d of the first cleats 340, the third cleat section 340c and fourth cleat section 340d of the second cleats 342, the fifth cleat section 340e of the first cleats 340 and the fifth cleat section 340e of the second cleats 340.

The recess 350 is adapted to at least partially receive an object 52 (illustrated in FIG. 3) that is being transported on the conveyor belt 310 such that at least a portion of the object 52 is in contact with the belting 320. The first cleats 340 and the second cleats 342 that are adjacent to the recess 350 resist movement of the object 52 on the conveyor belt 310.

The recess 350 is selected with a size based upon the size of the object 52 that is intended to be used in conjunction with the conveyor belt 310. In certain embodiments, the object 52 has dimensions that are smaller than the line spacing between adjacent first cleats 340 and/or adjacent second cleats 342.

In other embodiments, the object 52 has at least one dimension that is greater than the line spacing between adjacent first cleats 340 and/or adjacent second cleats 342. In such situations, a portion of the object 52 extends over at least one of the first cleats 340 and the second cleats 342.

A substantial portion of each object 52 should fit within each recess 350. As used herein, a substantial portion of each object 52 fitting within each recess 350 means that greater than about 80 percent of a length of the object 52 fits within the recess 350 and greater than about 80 percent of a width of the object 52 fits within the recess 350. Using the preceding configuration for the recess 350 minimizes the potential of the object 52 moving from the recess 350 once the object 52 is positioned in the recess 350.

Because the substantial portion of each object 52 fits within each recess 350, the object 52 primarily rests on the surface of the belting 320 as opposed to resting on an upper surface of the first cleats 340 and the second cleats 342. Such a configuration facilitates the first cleats 340 and the second cleats 342 resisting movement of the object 52 with respect to the conveyor belt 310.

While it is illustrated that one object 52 is placed in each recess 50, it is possible for the concepts of the invention to be adapted so that more than one object is placed in each recess 350.

Because the cleat length is determined based upon the size of the objects 52 that are anticipated to be placed on the conveyor belt 310, a width of the conveyor belt 310 may need to be wider to increase the amount of object 52 that can be conveyed with the conveyor belt 310, it is possible to replicate the configuration of the first cleats 340 and the second cleats 342 intermediate the first edge 330 and the second edge 332.

The first cleats 340 and the second cleats 342 are formed with a height that is selected based upon the size of the objects 52 that are intended to be used with the conveyor belt 310. The height of the first cleats 340 and the second cleats 342 should be sufficiently high to substantially restrict the objects from unintentionally moving over the first cleats 340 and/or the second cleats 342. As referenced above, in this embodiment of the conveyor belt 310, the first cleats 340 and the second cleats 342 both have a height of about ¾ of an inch.

In certain embodiments, the height of the first cleats 340 and the second cleats 342 is at least about 5 percent of a height of the objects 52. In other embodiments, the height of the first cleats 340 and the second cleats 342 is at least about 10 percent of the height of the objects 52.

While it is illustrated that the first cleats 340 all have an approximately equal height, it is possible for at least a portion of the first cleats 340 to be formed with a different height using the concepts of the invention. Similarly, it is possible for at least a portion of the second cleats 342 to be formed with a different height using the concepts of the invention. Additionally, it is possible for the first cleats 340 to be formed with a height that is different than the second cleats 342.

A person of skill in the art will appreciate that because of the irregular shape of the objects, the terms height, width and length are arbitrary to the orientation of the object 52 at a particular time and changes when the orientation of the object 52 on the conveyor belt 310 changes.

Because the cleats are separated into a plurality of first cleats 340 and second cleats 342, the first cleats 340 pivot away from each other when the conveyor belt 310 passes around the roller 24 (illustrated in FIG. 1) and the second cleats 342 pivot away from each other when the conveyor belt 310 passes around the roller 24.

This configuration thereby provides a smoother return of the belting 320 and puts less strain on the components of the conveyor belt 310 and thereby enhances the anticipated life of the conveyor belt 310. The cleat configuration of this invention also reduces chatter not only during the movement of the belting 320 but also as the belting 320 passes around the roller 24.

Use of the conveyor belt 310 of this embodiment is similar to the use of the conveyor belt 10 described above with respect to FIGS. 1-3. However, this embodiment is better suited for use with objects having a larger size than the objects 52 used in conjunction with the conveyor belt 10, a larger size than the objects used in conjunction with the conveyor belt 110 illustrated in FIG. 5 and a larger size than the objects used in conjunction with the conveyor belt 210 illustrated in FIG. 6.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A conveyor belt with flow control cleats comprising:
    belting having a first side edge and a second side edge;
    first cleats that extend from the belting, wherein the first cleats are oriented at an angle with respect to the first side edge of between about 30 degrees and about 60 degrees; and
    second cleats that extend from the belting, wherein the second cleats are oriented at an angle with respect to the second side edge of between about 30 degrees and about 60 degrees, wherein the first cleats and the second cleats both comprise:
    a first long cleat section;
    a second long cleat section;
    a short cleat section, wherein the short cleat section has a length that is shorter than a length of the first long cleat section and wherein the second long cleat section is between the first long cleat section and the short cleat section; and
    a third long cleat section, wherein the short cleat section is between the second long cleat section and the third long cleat section and wherein a first recess is defined between second long cleat section of the first cleats, the third long cleat section of the second cleats, the short cleat section of the first cleats and the short cleat section of the second cleats.

2. The conveyor belt of claim 1, wherein the first cleats and the second cleats have a height of about ¾ of an inch.

3. The conveyor belt of claim 1, wherein a second recess is defined between second long cleat section of the second cleats, the third long cleat section of the first cleats, the short cleat section of the second cleats and the short cleat section of the first cleats.

4. The conveyor belt of claim 1, wherein the first long cleat section, the second long cleat section, the short cleat section and the third long cleat section are in a substantially linear configuration.

5. The conveyor belt of claim 1, wherein a length of the second long cleat section and a length of the third long cleat section are approximately equal to the length of first long cleat section and wherein the length of the short cleat section is about 50 percent of the length of the first long cleat section.

6. The conveyor belt of claim 1, wherein a first end spacing is provided between the first long cleat section and the second long cleat section, wherein a second end spacing is provided between the second long cleat section and the short cleat section, wherein a third end spacing is provided between the short cleat section and the third long cleat section, wherein the first end spacing is approximately equal to the third end spacing and wherein the second end spacing is larger than the first end spacing.

7. The conveyor belt of claim 6, wherein the first end spacing is up to about 10 percent of the length of the first long cleat section and wherein the second end spacing is approximately equal to a length of the short cleat section.

8. The conveyor belt of claim 6, wherein the second end spacing of the first cleats is proximate the third end spacing of the second cleats and wherein the second end spacing of the second cleats is proximate the third end spacing of the first cleats.

9. The conveyor belt of claim 1, wherein there are a plurality of the first cleats that are positioned in a parallel configuration so that a line spacing between adjacent first cleats is approximately equal and wherein there are a plurality of the second cleats that are positioned in a parallel configuration so that a line spacing between adjacent second cleats is approximately equal.

10. The conveyor belt of claim 1, wherein the first cleats are substantially perpendicular to the second cleats.

11. A conveyor belt with flow control cleats comprising:
belting having a first side edge and a second side edge;
first cleats that extend from the belting, wherein the first cleats are oriented at an angle with respect to the first side edge of between about 30 degrees and about 60 degrees; and
second cleats that extend from the belting, wherein the second cleats are oriented at an angle with respect to the second side edge of between about 30 degrees and about 60 degrees, wherein the first cleats and the second cleats both comprise:
a first short cleat section;
a first long cleat section, wherein the first short cleat section has a length that is shorter than a length of the first long cleat section;
a second long cleat section, wherein the first long cleat section is between the first short cleat section and the second long cleat section; and
a second short cleat section, wherein the second long cleat section is between the first long cleat section and the second short cleat section and wherein a first recess is defined by the first long cleat section of the first cleats, the second long cleat section of the second cleats, the second long cleat section of the first cleats and the second short cleat section of the second cleats.

12. The conveyor belt of claim 11, wherein the first cleats and the second cleats have a height of about 1 inch.

13. The conveyor belt of claim 11, wherein a second recess is defined by the first long cleat section of the second cleats, the second long cleat section of the first cleats, the second long cleat section of the second cleats and the second short cleat section of the first cleats.

14. The conveyor belt of claim 11, wherein the first short cleat section, the first long cleat section, the second long cleat section and the second short cleat section are in a substantially linear configuration, wherein a length of the second long cleat section is approximately equal to the length of first cleat section, wherein a length of the second short cleat section is approximately equal to a length of first short cleat section and wherein the length of the first short cleat section is about 50 percent of the length of the first long cleat section.

15. The conveyor belt of claim 11, wherein a first end spacing is provided between the first short cleat section and the first long cleat section, wherein a second end spacing is provided between the first long cleat section and the second long cleat section, wherein a third end spacing is provided between the second long cleat section and the second short cleat section, wherein the first end spacing is approximately equal to the second end spacing and wherein the third end spacing is larger than the first end spacing, wherein the first end spacing is up to about 10 percent of the length of the first long cleat section and wherein the third end spacing is approximately equal to a length of the first short cleat section.

16. The conveyor belt of claim 15, wherein the second end spacing of the first cleats is proximate the third end spacing of the second cleats, wherein the second end spacing of the second cleats is proximate the third end spacing of the first cleats, wherein an end of the second short cleat section that is opposite the third end spacing in the first cleats is proximate the first end spacing in the second cleats and wherein an end of the second short cleat section that is opposite the third end spacing in the second cleats is proximate the first end spacing in the first cleats.

17. The conveyor belt of claim 11, wherein there are a plurality of the first cleats that are positioned in a parallel configuration so that a line spacing between adjacent first cleats is approximately equal, wherein there are a plurality of the second cleats that are positioned in a parallel configuration so that a line spacing between adjacent second cleats is approximately equal and wherein the first cleats are substantially perpendicular to the second cleats.

18. A conveyor belt with flow control cleats comprising:
belting having a first side edge and a second side edge;
first cleats that extend from the belting, wherein the first cleats are oriented at an angle with respect to the first side edge of between about 30 degrees and about 60 degrees; and
second cleats that extend from the belting, wherein the second cleats are oriented at an angle with respect to the second side edge of between about 30 degrees and about 60 degrees, wherein the first cleats and the second cleats both comprise:
a first cleat section;
a second cleat section;
a third cleat section, wherein the second cleat section is between the first cleat section and the third cleat section;
a fourth cleat section, wherein the third cleat section is between the second cleat section and the fourth cleat section; and
a fifth cleat section, wherein the fourth cleat section is between the third cleat section and the fifth cleat section and wherein a first recess is defined by the third cleat section and the fourth cleat section of the first cleats, the third cleat section and fourth cleat section of the second cleats, the fifth cleat section of the first cleats and the fifth cleat section of the second cleats.

19. The conveyor belt of claim 18, wherein the first cleats and the second cleats have a height of about 1.5 of an inch.

20. The conveyor belt of claim 18, wherein the first cleat section, the second cleat section, the third cleat section, the fourth cleat section and the fifth cleat section are in a substantially linear configuration.

21. The conveyor belt of claim 18, wherein a first end spacing is provided between the first cleat section and the second cleat section, wherein a second end spacing is provided between the second cleat section and the third cleat section, wherein a third end spacing is provided between the third cleat section and the fourth cleat section, wherein a fourth end spacing is provided between the fourth cleat section and the fifth cleat section, wherein the first end spacing is approximately equal to the second end spacing and the third end spacing, wherein the fourth end spacing is larger than the first end spacing, wherein the first end spacing is up to about 10 percent of the length of the first cleat section and wherein the fourth end spacing is approximately equal to a length of the fifth cleat section.

22. The conveyor belt of claim 21, wherein the fourth end spacing of the first cleats is proximate the fourth cleat section of the second cleats, wherein the fourth end spacing of the second cleats is proximate the fourth cleat section of the first cleats, wherein an end of the fifth cleat section that is opposite the fourth end spacing in the first cleats is proximate the second cleat section in the second cleats and wherein an end of the fifth cleat section that is opposite the fourth end spacing in the second cleats is proximate the second cleat section in the first cleats.

23. The conveyor belt of claim 18, wherein there are a plurality of the first cleats that are positioned in a parallel configuration so that a line spacing between adjacent first cleats is approximately equal and wherein there are a plurality of the second cleats that are positioned in a parallel configuration so that a line spacing between adjacent second cleats is approximately equal and wherein the first cleats are substantially perpendicular to the second cleats.

\* \* \* \* \*